United States Patent Office 3,139,398
Patented June 30, 1964

3,139,398
METHOD OF OPERATING A HYDROCRACKING PROCESS TO INCREASE ON-STREAM LIFE OF CATALYST AND IMPROVE PRODUCT QUALITY
Ben G. Bray, Richmond, and Harold F. Mason, Berkeley, Calif., assignors to California Research Corporation, San Francisco, Calif., a corporation of Delaware
Filed Mar. 1, 1962, Ser. No. 176,527
1 Claim. (Cl. 208—59)

INTRODUCTION

This invention relates to a hydrocarbon conversion process, more particularly to a hydrocracking process for converting petroleum distillates and residual stocks to naphthas and other products in the presence of hydrogen and a hydrocracking catalyst comprising a hydrogenating-dehydrogenating component disposed on a solid, active, acidic support, and still more particularly to a process for extending the on-stream life of the hydrocracking catalyst by reducing its fouling rate and for improving the product quality, including aromatics content and octane number.

PRIOR ART

The rate of catalyst deactivation and the difficulty in producing, without subsequent reforming, products with high quality, including aromatics content and octane number, constitute well known limitations of hydrocracking processes. Various expedients have been used heretofore in attempts to circumvent these limitations; for example, attention has been directed to feed nitrogen content and to the maintenance of the average reaction temperature in the hydrocracking reactor at a level as low as practicable consistent with obtaining adequate conversion.

Minimizing average reaction temperatures has been practiced in various ways, with attention having been given to: (1) the temperature gradient across an individual catalyst bed in a multibed hydrocracking reaction zone; and (2) the temperature gradient across an entire series of catalyst beds in a multibed hydrocracking reaction zone.

Hydrocracking reactions are exothermic; accordingly, if the temperature gradient through a single hydrocracking catalyst bed is not controlled, it will normally be an ascending gradient through the bed. Generally, the gradient is not controlled, although a great deal of control conventionally is exerted on the average catalyst bed temperature. A high average catalyst bed temperature tends to diminish the deleterious effect of nitrogen in the feed, and it is generally necessary to continuously raise the average catalyst bed temperature during the on-stream life in order to maintain desired per-pass conversion levels as the catalyst activity decreases because of coke laydown and other phenomena. However, higher average catalyst bed temperatures in turn cause increased catalyst fouling. Accordingly, strict control of the average catalyst bed temperature generally is exerted to maintain adequate per-pass conversion levels without increasing catalyst fouling rate more than necessary. Such control of the average catalyst bed temperature can be accomplished whether or not the temperature gradient through the catalyst bed is controlled. Because this temperature gradient generally is not controlled, it generally is an ascending gradient because of the exothermic nature of the hydrocracking reaction.

Another temperature gradient is defined by the mid-bed temperatures in a series of catalyst beds in a hydrocracking reaction zone. Heretofore, it has been felt that this temperature gradient should range from zero, wherein all catalyst mid-bed temperatures are equal, to a negative gradient, wherein the mid-bed temperature of each successive bed is somewhat lower than that of the preceding bed.

OBJECTS

In view of the foregoing, it is an object of the present invention to provide criteria for maintaining in a hydrocracking reaction zone a temperature gradient defined by the mid-bed temperatures in a series of hydrocracking catalyst beds, whereby improved operating results, including increased catalyst life and improved product quality, are obtained.

DRAWINGS

This invention will be more clearly understood, and further objects and advantages thereof will be apparent, from the following description when read in conjunction with the accompanying drawings, in which.

Figure 4:
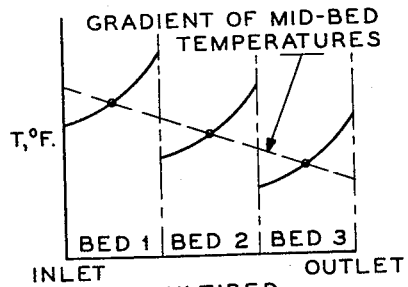
Figure 5:
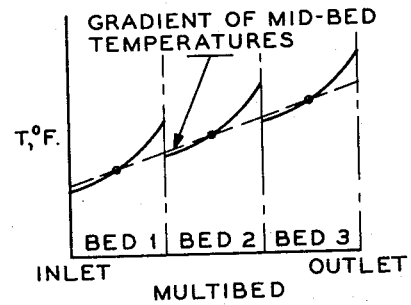

FIG. 4 is a qualitative graphical representation of temperature gradients across a series of three hydrocracking catalyst beds, wherein the temperature gradient within each bed is uncontrolled, but the temperature gradient defined by the catalyst mid-bed temperatures is controlled to a negative value; and FIG. 5 is a qualitative graphical representation of temperature gradients across a series of three hydrocracking catalyst beds, wherein the temperature gradient within each bed is uncontrolled, but the temperature gradient defined by the catalyst mid-bed temperature is controlled to a positive value.

STATEMENT OF INVENTION

In accordance with the present invention, there is provided, in a continuous hydrocracking process wherein the hydrocracking catalyst is arranged in a series of catalyst beds, the method of increasing catalyst life and improving product quality, including aromatics content and octane number, which comprises maintaining the mid-bed temperatures of said beds in an ascending temperature gradient during at least a substantial portion of the on-stream period.

Further in accordance with the present invention, there is provided a continuous hydrocracking process which comprises continuously contacting a hydrocarbonaceous feed boiling above about 200° F. in a hydrocracking zone comprising a series of catalyst beds in the presence of at least 1000 s.c.f. of hydrogen per barrel of feed with a catalyst comprising a hydrogenating-dehydrogenating component disposed on an active cracking support at a temperature of about from 400° to 900° F., a pressure of at least 500 p.s.i.g., and an LHSV of about from 0.1 to 15.0, withdrawing from said zone at least one normally gaseous fraction and at least one normally liquid hydrocarbon product fraction, and during at least a substantial portion of each on-stream period maintaining the mid-bed temperature of each of said beds subsequent to the first bed contacted by said feed at a temperature higher than the mid-bed temperature of the preceding bed.

HYDROCARBON FEED

The process of the present invention is applicable in the processing of hydrocarbonaceous feeds boiling above about 200° F., including heavy distillates normally defined as heavy straight run gas oils and heavy cracked cycle oils, as well as conventional FCC feeds and portions thereof. Cracked stocks may be obtained from thermal or catalytic cracking of various stocks, including those obtained from petroleum, gilsonite, shale and coal tar. Residual feeds may include Minas paraffinic residua which may boil above 1100° F. and other paraffinic-type residua.

NITROGEN CONTENT OF FEED

The present invention is particularly useful in hydrocracking processes operated with fresh feed make-up streams to the hydrocracking zone containing less than about 30 p.p.m. total nitrogen, preferably less than 10 p.p.m., and still more preferably less than 1.0 p.p.m.

Feed stocks containing more than about 30 p.p.m. total nitrogen preferably are subjected to a pretreating operation that is relatively selective for the removal of nitrogen compounds. The desired low nitrogen levels may be reached, for example, by intimately contacting the feed stocks with various acidic media, such as $H_2SO_4$ or other liquid acids, or, in the case of feeds that are comparatively low in nitrogen compounds, with such solid acidic materials as acid ion exchange resins and the like. However, it is preferred to carry out denitrification by catalytic hydrogenation (hydrofining) of the feed. This entails contacting the feed at temperatures of from about 400° to 900° F., preferably from about 500° to 800° F., pressures of at least 300 p.s.i.g., liquid hourly space velocities of from about 0.3 to 5.0 along with a tleast 500 s.c.f. of hydrogen per barrel of feed, with a sulfur-resistant hydrogenation catalyst. Any of the known sulfactive hydrogenation catalysts may be used in the hydrofining pretreatment. The preferred catalysts have, as their main active ingredient, one or more oxides or sulfides of the transition metals, such as cobalt, molybdenum, nickel and tungsten. These various materials may be used in a variety of combinations with or without such stabilizers and promoters as the oxides and carbonates of K, Ag, Be, Cu, Mg, Ca, Sr, Ba, Ce, Bi, Cr, Th, Si, Al and Zr. These various catalysts may be unsupported or disposed on various conventional supporting materials, for example charcoal, fuller's earth, kieselguhr, silica gel, alumina, bauxite and magnesia. While any of the noted classes of conventional sulfactive hydrogenation catalysts may be employed, it has been found that particularly desirable catalysts are: (1) a molybdenum oxide catalyst promoted by a minor amount of cobalt oxide and supported upon an activated alumina; (2) tungsten sulfide on activated alumina; (3) tungsten sulfide promoted by cobalt oxide or nickel oxide; and (4) a molybdenum sulfide catalyst promoted by a minor amount of nickel sulfide supported on activated alumina. The catalyst may be in the form of fragments or formed pieces, such as pellets, extrudates and cast pieces of any suitable form or shape.

An effective hydrofining catalyst comprises cobalt impregnated on a coprecipitated molybdena-alumina (e.g., prepared in accordance with the disclosures of U.S. Patent 2,432,286 to Claussen et al. or U.S. Patent 2,697,006 to Sieg), combined with cobalt oxide, the final catalyst having a metals content equivalent to about 2% cobalt and 7% molybdenum.

Operable hydrofining conditions are temperatures of 600° to 800° F., pressures of 200 to 3000 p.s.i.g., space velocities of 0.5 to 3.0, and 1000 to 15,000 s.c.f. of hydrogen per barrel of hydrocarbon feed.

OPERATING CONDITIONS IN HYDROCRACKING ZONE

The hydrocarbon feed and hydrogen are contacted in the hydrocracking zone, containing a series of catalyst beds, at pressures of at least 500 p.s.i.g., preferably about from 800 to 3000 p.s.i.g. The average of the mid-bed caatlyst temperatures is about from 400° to 900° F., preferably 500° to 800° F. This average temperature during the on-stream period preferably is maintained at as low a value as possible consistent with maintaining adequate per-pass conversion as catalyst fouling progresses. While those skilled in the art will realize that the desired initial and terminal values of this average temperature will be influenced by various factors, including character of feed and catalyst, generally speaking it will be desirable to operate the process with an initial on-stream value for this temperature of from about 500° to 650° F., with a progressive increase to about 750° to 800° F., to maintain substantially constant conversion of at least 25 volume percent, preferably 35 to 90 volume percent, per pass of the hydrocarbon feed to products boiling below the initial boiling point of that feed.

HYDROCRACKING CATALYST

The cracking component of the catalyst of the present invention may comprise any one or more of such acidic materials as silica-alumina, silica-magnesia, silica-alumina-zirconia composites, alumina-boria, fluorided composites, and the like, as well as various acid-treated clays and similar materials. Preferred catalysts will comprise silica-alumina supports having silica contents in the range of from about 30 to 99 percent by weight. The hydrogenating-dehydrogenating components of the catalyst can be selected from any one or more of the various Groups V, VI, VII and VIII metals, as well as the oxides, sulfides and selenides thereof, alone or together with promoters or stabilizers that may have by themselves small catalytic effect, representative materials being the oxides, sulfides and selenides of molybdenum, tungsten, vanadium, chromium and the like, as well as of metals such as iron, nickel, cobalt, platinum and palladium. If desired, more than one hydrogenating-dehydrogenating component can be present, and good results have been obtained with catalysts containing composites of two or more of the oxides of molybdenum, cobalt, chromium and zinc, and with mixtures of said oxides with fluorides. The amount of the hydrogenating-dehydrogenating component present can be varied within relatively wide limits of from about 0.5 to 30 percent based on the weight of the entire catalyst.

Exemplary acidic-type catalysts having satisfactory characteristics as aforesaid include those containing (a) about .1 to 25% molybdenum oxide, (b) a mixture of from 1 to 20% molybdenum oxide and from 0.1 to 10% cobalt oxide or nickel oxide, (c) mixtures of from about 0.5 to 10% each of cobalt oxide and chromium oxide, (d) 0.1 to 20% nickel, nickel oxide or nickel sulfide, (e) 0.1 to 10% cobalt, cobalt oxide or cobalt sulfide, (f) mixtures of from 0.1 to 10% each of nickel and cobalt, as metal, oxide or sulfide, (g) 0.1 to 5% platinum, palladium or rhodium, in each case the said hydrogenating-dehydrogenating component being deposited on an active cracking support comprising silica-alumina beads having a silica content of about 70 to 99%. Thus, the molybdenum oxide catalyst can be readily prepared by soaking the beads in a solution of ammonium molybdate, drying the catalyst for 24 hours at 220° F., and then calcining the dried material for 10 hours at 1000° F. If cobalt oxide is also to be present, the calcined beads can then be similarly treated with a solution of a cobalt compound, whereupon the catalyst is again dried and calcined. Under favorable operating conditions, the hydrocracking catalyst will maintain high activity over periods of 50 to 300 or more hours. The activity of the used catalyst can then be increased, if desired, by a conventional regeneration treatment involving burning off catalyst contaminants with an oxygen-containing gas.

PROCESS OPERATION

Figure 1:
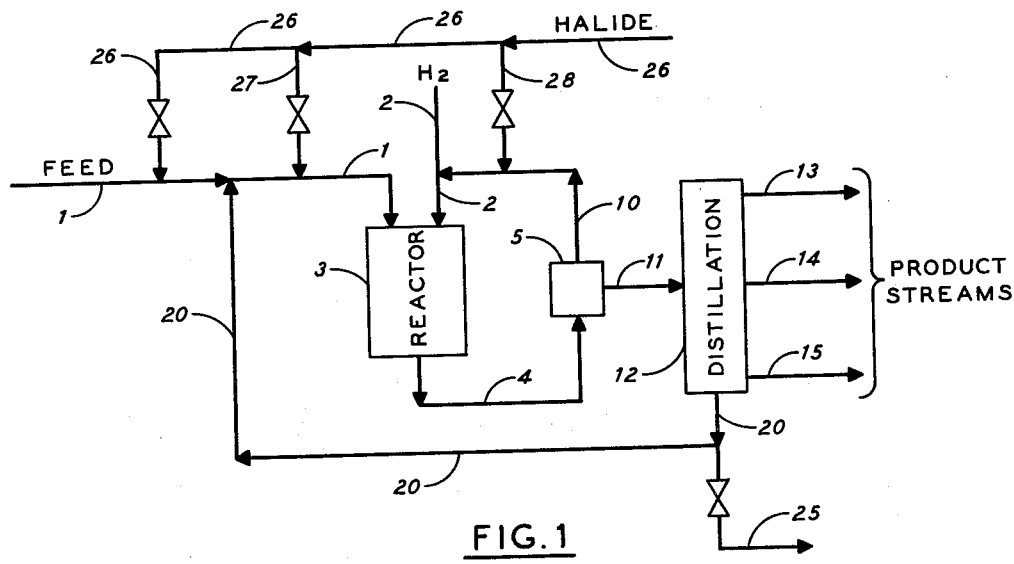
FIG. 1 is a diagrammatic illustration of a simplified embodiment of process units and flow paths suitable for carrying out the process of the present invention.

Referring now to FIG. 1, there shown is a simplified schematic illustration of an embodiment of process units and flow paths suitable for carrying out the process of the present invention.

The fresh feed, which may contain nitrogen, and which may be a raw feed or a hydrofined feed from a previous hydrofining stage, is passed through line 1 to hydrocracking zone 3 where it is hydrocracked in the presence of make-up hydrogen, supplied through line 2, and in the presence of a hydrocracking catalyst under suitable conditions, all as discussed previously. From hydrocracking zone 3, an effluent is passed through line 4 to high pressure separator 5. From high pressure separator 5 hydrogen may be recycled through line 10 to hydrocracking zone 3, and a hydrocarbon stream is passed to distillation column 12, from which various products may be recovered through lines 13, 14 and 15. From distillation column 12, a bottoms stream may be recycled through line 20 to hydrocracking zone 3. If desired, a portion of the stream withdrawn through line 20 may be withdrawn from the system through line 25. If desired, a halide, including a fluoride, chloride, bromide and/or iodide, preferably a fluoride and/or chloride, may be supplied to the system to decrease the catalyst fouling rate. Good results have been obtained with organic halides, including fluorobenzene. The halide may be supplied from a source not shown, through line 26, and may be introduced into the system at any convenient point or points, for example into the feed through line 26 as shown, and/or through line 27, and/or through line 28, and/or to the recycle stream in line 20.

Figure 2:
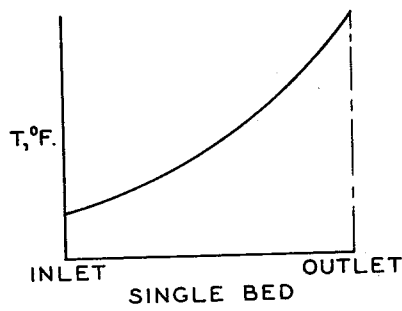
FIG. 2 is a qualitative graphical representation of a conventional uncontrolled temperature gradient through a single hydrocracking catalyst bed.

Referring now to FIG. 2, there shown is a qualitative graphical representation of a conventional uncontrolled temperature gradient through a single hydrocracking catalyst bed. The temperature gradient across a hydrocracking catalyst bed is a function of (1) heat of reaction, (2) specific heat of reactants and products, and (3) any quench or other temperature control applied to the bed, for example a hydrogen quench to control temperature. Because (1) and (2) are fixed by the nature of the hydrocarbon feed and the nature of the reaction, and because a hydrocracking reaction is exothermic, then, in the absence of (3), the uncontrolled temperature gradient through a hydrocracking catalyst bed will be as shown in FIG. 2.

Figure 3:
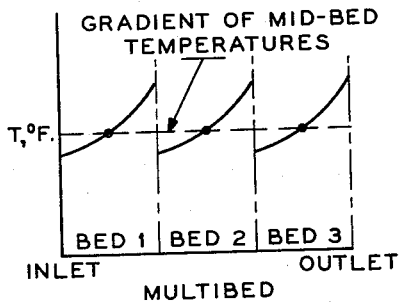
FIG. 3 is a qualitative graphical representation of temperature gradients across a series of three hydrocracking catalyst beds, wherein the temperature gradient within each bed is uncontrolled, but the temperature gradient defined by the catalyst mid-bed temperatures is controlled to a value of zero.

Referring now to FIG. 3, there shown is a qualitative graphical representation of temperature gradients across a series of three hydrocracking catalyst beds wherein the temperature gradient in each bed is uncontrolled, but the temperature gradient defined by the catalyst mid-bed temperatures is controlled to a value of zero. Such control to a zero temperature gradient, which may be achieved by various means including bed heaters, and hydrogen quenches, is conventionally used so that the catalyst system may be operated as close to isothermal conditions as may reasonably be maintained.

Referring now to FIG. 4, there shown is a qualitative graphical representation of temperature gradients across a series of three hydrocracking catalyst beds wherein the temperature gradient in each bed is uncontrolled, but the temperature gradient defined by the catalyst mid-bed temperatures has been controlled to a negative value. This method of control has been used frequently heretofore as an alternative to the FIG. 3 type of operation.

Referring now to FIG. 5, there shown is a qualitative graphical representation of temperature gradients across a series of three hydrocracking catalyst beds, when operating in accordance with the present invention. The temperature gradient within each bed may be uncontrolled, as shown, or may be controlled to gradients different from those shown, but the temperature gradient defined by the catalyst mid-bed temperatures must be controlled to a value that is positive, i.e., ascending from inlet to outlet through the reactor.

The temperature gradient in accordance with the present invention is a substantially linear ascending gradient, as shown in FIG. 5, which has an angle of slope greater than zero degrees and generally less than that for a single bed adiabatic-type operation. The preferred gradient is one wherein the temperature difference, in degrees Fahrenheit, between successive mid-bed temperatures is in the range of about $30/n$ to $100/n$, where $n$ is the number of catalyst beds. For example, with five beds the temperature difference between successive mid-bed temperatures preferably is 6° to 20° F.

As previously discussed, the temperature gradient through a single bed is not the temperature gradient with which the present invention is concerned; the temperature gradient within a single bed during practice of the present invention may have any slope and may be the result of operating the bed with or without temperature control.

It has been found that practice of the present invention results in a product of increased aromatics content and higher octane number, and also results in a marked reduction in the hydrocracking catalyst fouling rate in degrees Fahrenheit per hour, and therefore a marked increase in catalyst life. These advantageous results are clearly apparent from a comparison of the following examples. In each example, a hydrocarbon cycle oil feed is hydrocracked in a multibed hydrocracking reactor having five catalyst beds, under the hydrocracking zone operating conditions set forth above. In each example, the operating conditions are held constant, except for the temperature profile through the catalyst beds, i.e., the temperature gradient through the rector defined by all of the catalyst mid-bed temperatures.

Table

| Example | Temperature Gradient Defined by Catalyst Mid-Bed Temperatures | Observed Fouling Rate, ° F./hour | Average of Catalyst Mid-Bed Temperatures (° F.) | Mid-Bed Temperature of Final Bed | 180° to 400° F. Cut | | | |
|---|---|---|---|---|---|---|---|---|
| | | | | | Volume Percent | | | F-1 Clear Octane No. |
| | | | | | Aromatics | Paraffins | Naphthenes | |
| 1 | 50° F. Decreasing | 0.125 | 589 | 564 | 25.4 | 24.4 | 50.2 | 71.5 |
| 2 | Uniform | 0.12 | 591 | 591 | 26.6 | 23.7 | 49.7 | 71.2 |
| 3 | 80° F. Increasing | 0.085 | 588 | 628 | 28.6 | 23.0 | 48.4 | 74.4 |

From the foregoing results it may be seen that when the temperature gradient defined by the catalyst mid-bed temperatures increased 80° F. across the entire reactor there was a marked improvement in catalyst fouling rate, product aromatics content, and product octane number over the runs wherein the temperature gradient defined by the catalyst mid-bed temperatures was either a uniform gradient or a decreasing gradient.

It was found that the lower catalyst fouling rate resulting from the increased temperature gradient through the catalyst beds would substantially increase the permissible run length before the catalyst became fouled to an extent that would render it unsatisfactory to be continued in service without regeneration. The increase of approximately three octane numbers in the F-1 clear octane rating of the product is a most remarkable result, particularly in view of the extremely expensive expedients that have been employed heretofore in order to accomplish even a portion of this increase.

While it is not a present purpose to provide a detailed theory explaining why the advantageous results are obtained with the present invention, or to be bound by any theory advanced, it is probable that operation in accordance with the present invention permits all portions of the catalyst in the various beds to be operated with a substantially equivalent rate and extent of deactivation, resulting in an equal differential conversion per volume of catalyst from entrance to exit through the reactor. This equalization of catalyst deactivation through the reaction zone permits the total catalyst charge in the reactor to accomplish a greater total amount of conversion before it must be regenerated. It is quite unexpected to find that controlling the temperature gradient defined by the mid-bed catalyst temperatures through the reactor to a positive value as in the present invention results in decreased catalyst fouling rates; in fact, heretofore, the art would have believed that substantially the opposite result would occur with this type of operation and therefore that, if any improvement in catalyst fouling rate could be obtained through temperature gradient control, it could only be obtained by controlling the temperature gradient to zero or a negative value.

TYPES OF OPERATION TO WHICH PROCESS IS ADAPTED

The process of the present invention may be operated as a once-through or in a recycle manner. A very desirable method of operation is with separation from the hydrocracking zone effluent of an ammonia-free hydrogen-rich gas stream which is recycled to the hydrocracking zone. Various hydrocracking fractions not converted below the initial boiling point of the feed may be recycled to advantage, particularly aromatics-rich fractions. The product fractions from the hydrocracking zone that boil below the initial boiling point of the feed constitute excellent gasoline blending stocks for certain purposes; however, it will be found generally more desirable to send at least the heavier portions of them to a catalytic reformer where they will serve as a most excellent preferred feed for catalytic reforming operations.

While the invention may be carried out with a fixed hydrocracking catalyst bed, which may be periodically regenerated in situ, if desired, the process is also well adapted to other types of reactor systems such as staged reactors or variants of the fluidized catalyst type. However, since, in carrying out the process of the present invention, the catalyst retains its activity over longer periods of time compared with prior art operations, it will normally be preferable, from an economic standpoint, to employ the fixed catalyst bed method of operation or some modification thereof.

The feed may be introduced into the hydrocracking zone as a liquid, vapor, or mixed liquid-vapor phase, depending upon the temperature, pressure, proportions of hydrogen, and boiling range of the charge stocks utilized.

From the foregoing, it may be seen that the process of the present invention is effective in enabling a hydrocracking process to be operated both with nitrogen-containing feeds and with extended catalyst life at reasonable operating temperatures and conversions.

Although only specific modes of operation of the process of the present invention have been described, numerous variations could be made in those modes without departing from the spirit of the invention, and all such variations that fall within the scope of the appended claim are intended to be embraced thereby.

We claim:

In a continuous hydrocracking process which comprises continuously contacting a hydrocarbonaceous feed boiling above about 200° F. and containing less than 30 p.p.m. nitrogen in a hydrocracking zone comprising a series of catalyst beds, each containing the same hydrocracking catalyst, and each of approximately the same size, in the presence of at least 1000 s.c.f. of hydrogen per barrel of feed, with a catalyst comprising a hydrogenating-dehydrogenating component disposed on an active cracking support at a temperature of about from 400° to 900° F., a pressure of at least 500 p.s.i.g., and an LHSV of about from 0.1 to 15.0, and withdrawing from said zone at least one normally gaseous fraction and at least one normally liquid hydrocarbon product fraction, the improvement which comprises maintaining the mid-bed temperatures of said beds in a substantially linear ascending gradient during substantially all of the on-stream period, by maintaining the temperature difference in degrees Fahrenheit between the mid-bed temperatures of adjacent beds at from about $30/n$ to $100/n$, where $n$ is the number of catalyst beds in the hydrocracking zone, whereby catalyst life and product quality, including octane number, are improved.

References Cited in the file of this patent

UNITED STATES PATENTS 2,971,901     Halik et al. _____ Feb. 14, 1961